Patented Mar. 17, 1953

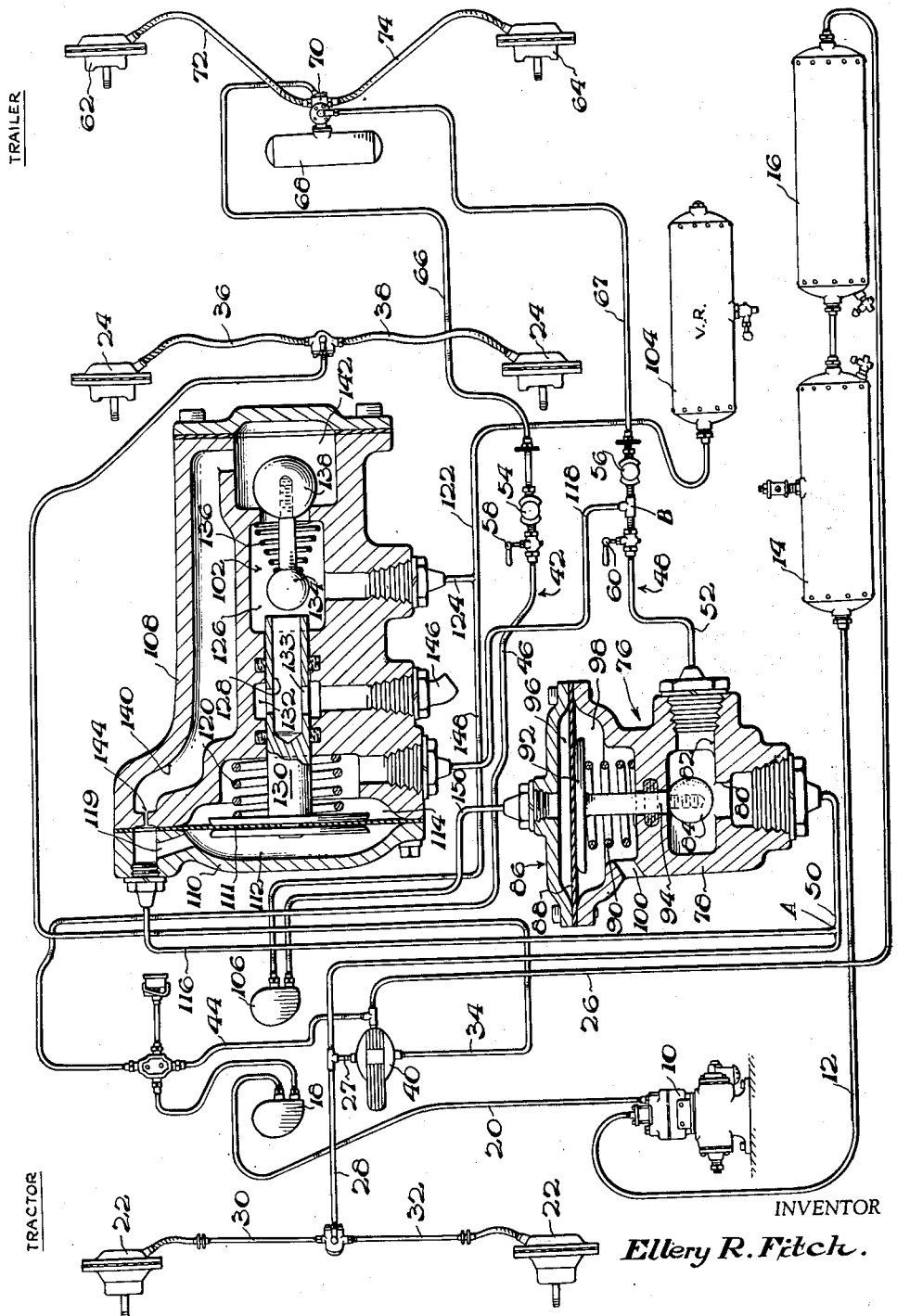

2,631,691

UNITED STATES PATENT OFFICE 2,631,691

SERVICE LINE PROTECTION VALVE

Ellery R. Fitch, Elyria, Ohio, assignor to Bendix-Westinghouse Automotive Air Brake Company, Elyria, Ohio, a corporation of Delaware Application October 31, 1949, Serial No. 124,631

15 Claims. (Cl. 188—3)

This invention relates to fluid pressure braking systems for tractor-trailer vehicles and more particularly to a valve construction for conserving fluid pressure on the tractor for efficient braking operations, notwithstanding the occurrence of a break or leak in certain of the brake lines on the vehicle.

In fluid pressure braking systems of the type generally utilized for tractor-trailer vehicles, the same have been so arranged as to provide interconnected service and emergency lines on the vehicles, the service lines being provided for the usual service applications of the brakes, while the emergency lines are employed for automatically applying the trailer brakes in the event of rupture or severe leakage of the emergency lines. During the usual service brake applications, fluid pressure is conducted from a source on the tractor to the tractor brake chambers and such pressure is also fed to the trailer service line to operate a relay valve and thereby connect a trailer reservoir to the trailer brake chambers. Should the tractor or trailer service lines become broken or develop a severe leakage, fluid may be released from the source so rapidly that an effective service brake application on the tractor could not be obtained. Moreover, under such conditions, the leakage of fluid may be such as to prevent the trailer relay valve from operation and thus a total failure of both the tractor and trailer brakes would result.

Accordingly, the principal object of the present invention is to provide a fluid pressure braking system for tractor-trailer vehicles which is so constituted as to avoid the objections and disadvantages referred to above.

Another object is to provide in a fluid braking system for tractor-trailer vehicles, a novel arrangement for conserving the fluid pressure on the tractor in the event of a severe leak or breakage of the service lines of the tractor or trailer.

A further object is to provide a novel control device on the tractor which is adapted to be interposed in the tractor service line and is operative to interrupt the flow of fluid therethrough after a predetermined time interval, in the event that the fluid flow through the service line exceeds a predetermined rate.

Still another object resides in the provision of a cut-off valve arranged in the tractor service line, together with a novel control therefor, such control being responsive to a pressure differential measured between two points in the tractor service line and functioning with a time delay action to energize the cut-off valve and thereby prevent flow of fluid through said tractor service line.

A still further object is to provide a novel, relatively simple but highly effective and reliable control device for enabling application of the tractor brakes while preventing loss of fluid through a broken service line.

Still another object comprehends the provision of a control device of the above character, which is positive in its operation and which does not interfere with the normal operation of the brake systems on the two vehicles.

Other objects and novel features of the invention will appear more fully hereinafter from the following detailed description when taken in connection with the accompanying drawing illustrative of one form of the invention. It is to be expressly understood however that the drawing is employed for purposes of illustration only and is not to be taken as a definition of the limits of the invention, reference being had for this purpose to the appended claims.

Referring to the drawing, the single figure diagrammatically illustrates the present invention in connection with a tractor-trailer braking system, certain of the parts being shown in section.

More particularly, and as shown, the present invention is employed in connection with a tractor-trailer braking system of a well-known type adapted to be operated by air under pressure. For example, the tractor braking system includes a compressor 10 for supplying compressed air through a conduit 12 to a pair of serially connected reservoirs 14 and 16, the loading and unloading of the compressor being preferably controlled by a governor 18, connected to the compressor 10 as by means of a conduit 20. Governor 18 may be of any suitable construction such as that disclosed in the patent to B. S. Aikman No. 1,754,218, granted April 15, 1930. Front and rear braking chambers 22 and 24 are provided for respectively applying the front and rear brakes of the tractor and these chambers may be supplied with air pressure from the reservoir 16 through conduits 26, 27, 28, 30, 32, 34, 36 and 38, a suitable pedal operated brake valve 40, which may be constructed as shown in the patent to W. J. Andres et al. No. 2,133,275, granted October 18, 1938, being associated with the conduits 26, 27 and 34 in order to control the degree of brake application of the front and rear brake chambers.

In order to provide suitable connections for the trailer braking system, the tractor braking system includes an emergency line 42 comprising conduits 44 and 46, as well as a service line 48 which includes conduits 50 and 52. The emergency and service lines 42 and 48 terminate in coupling parts of well-known construction which are adapted to be coupled with similar parts associated with the trailer braking system in order to provide releasable couplings 54 and 56. In addition, the trailer emergency and service lines 42 and 48 are respectively provided with cut-off cocks 58 and 60 in order to positively cut off these lines when the couplings 54 and 56 are disconnected prior to separation of the vehicles.

The trailer braking system includes a plurality of brake chambers, two of which are shown at 62 and 64. Such system also embodies an emergency line 66, a service line 67 and a trailer reservoir 68, all of the foregoing being interconnected through a relay-emergency valve 70 of any suitable type, such as for example, that shown in the patent to S. Johnson, Jr., No. 2,018,212, granted October 22, 1935. The operation of the valve 70 is such that it normally connects the emergency line 66 with the reservoir 68 to maintain the latter charged with air pressure from the tractor reservoir 16. The valve 70 is also of such construction as to connect the trailer reservoir 68 with the brake chambers 62 and 64 through conduits 72 and 74 whenever the service line 67 is charged with fluid pressure through operation of the tractor brake valve 40. The construction is moreover also such, that in the event of a rupture of the emergency line 66, which would be caused for example by a break-in-two of the vehicles, the valve 70 would function automatically to supply air pressure to the brake chambers 62 and 64 from the reservoir 68 in order to effect an emergency application of the trailer brakes.

From the foregoing, it will be readily appreciated that in order to effect a normal service application of the vehicle brakes, it is only necessary for the operator to depress the pedal of the tractor brake valve 40. This action serves to conduct air pressure from the reservoir 16 to the tractor brake chambers 22 by way of conduits 26, 27, 28, 30 and 32. Simultaneously, air pressure is conducted to the rear tractor brake chambers 24 by means of conduits 34, 36 and 38. In addition, the tractor service line 48 is charged with fluid pressure through conduits 50 and 52, in order to charge the trailer service line 67 to effect an application of the trailer brake chambers 62 and 64 through operation of the valve 70 which controls the trailer reservoir 68.

Should a severe leak occur in the service lines of the tractor or trailer, it will be readily understood that fluid pressure in the reservoirs 14 and 16 might be depleted so rapidly that an efficient application of the tractor and trailer brakes could not be effected. Such a severe leak might be caused by a broken service line on the tractor or trailer or by reason of an accidental parting of the coupling 56. By the present invention, this difficulty is overcome and an efficient application of the trailer brakes may be effected notwithstanding the occurrence of the aforesaid ruptured service lines.

In its broader aspect, the present invention includes an arrangement for positively interrupting the flow of air through the tractor service line 48 in the event that the rate of flow therethrough, due to a broken or ruptured service line, exceeds a predetermined value and persists for a predetermined time interval. More particularly, the arrangement comprises a fluid pressure responsive cut-off valve 76, positioned on the tractor and being arranged in series between conduits 50 and 52. As shown, the valve 76 comprises a casing 78 having inlet and outlet ports 80 and 82 which are respectively connected with the conduits 50 and 52, flow of fluid pressure through said conduits being controlled by a normally open valve 84. A fluid pressure actuator 86 is positioned at the upper portion of the casing 78 and comprises a diaphragm 88 which is normally urged to the position shown by a spring 90, this action closing the valve 84 through a diaphragm follower 92 which is provided with a rod 94 rigidly connected with the valve 84. The space above the diaphragm constitutes a control chamber 96 while the space beneath the diaphragm forms an atmospheric chamber 98, the latter being constantly open to the atmosphere through an opening 100. From this construction it will be clear that the normally open valve 84 may be closed in order to interrupt flow of air through the tractor service line 48, upon supplying the control chamber 96 with fluid pressure sufficient to overcome the tension of spring 90.

A novel arrangement is provided by the invention for controlling the application of fluid pressure to the cut-off valve 76 and more particularly, such arrangement is so constituted as to energize the valve and close off the service line in the event the latter is broken or develops serious leakage which might be sufficient to prevent efficient application of any of the tractor brakes. More particularly, the foregoing construction includes a timing valve 102, a volume or timing reservoir 104 and a fluid pressure actuated valve 106 which are effective to supply fluid pressure to the control chamber 96 under conditions which will appear more fully hereinafter.

In order to obtain a measure of the flow conditions in the tractor service line 48, the timing valve 102 is provided with a casing 108 having a fluid pressure actuator 110 positioned at one end thereof, the latter including a diaphragm 111 which forms, with the casing, a pair of opposite chambers 112 and 114 which are respectively connected to the tractor service line 48 at spaced-apart points A and B through conduits 116 and 118, a duct 119 being provided in the casing 108 for connecting the conduit 116 and the chamber 112. Normally, the diaphragm 111 is maintained in the position shown as by means of a spring 120 in order to connect the volume or timing reservoir 104 to the atmosphere by way of conduits 122 and 124, an outlet chamber 126, an exhaust bore 128 formed in valve actuating member 130 carried by the diaphragm 111, and an exhaust chamber 132 which is in constant communication with an atmospheric connection 146 and also communicates with the bore 128 through ports 133, it being observed that the right hand end of the member 130 is spaced from an exhaust valve 134. However, it will be readily observed, that in the event the diaphragm 111 is moved to the right against the tension of the spring 120, such movement will first bring the right hand end of the member 130 into contact with the exhaust valve 134 in order to interrupt the atmospheric connection to the volume reservoir 104. Thereafter, the timing valve 102 will be moved against the tension of a spring 136 in order to open an inlet valve 138 and connect the volume reservoir 104 with the service line conduit 50 by way of conduit 116, passage 140 in the casing 108, inlet chamber 142, outlet chamber 126 and the interconnected conduits 124 and 122. Under these conditions, fluid under pressure will be conducted from the tractor brake valve to the volume reservoir to charge the latter. In order to regulate the rate of charging of the volume reservoir 104, a timing choke 144 may be incorporated in the passage 140, and if desired, the atmospheric connection 146 associated with the exhaust chamber 132 may be restricted in order to maintain the cut-off valve 86 closed during operation of the brake valve 40 in its release position, as will appear more fully hereinafter.

In addition to the foregoing, the invention includes the fluid pressure actuated valve 106 which is connected with the volume reservoir, by way of conduits 148 and 122, and is connected with the control chamber 96 of the cut-off valve 76 by conduit 150. This valve is of the fluid pressure actuated type and may be constructed in a manner similar to the governor 18. During operation thereof, it is effective to connect the conduits 148 and 150 when a predetermined pressure is built up in the timing reservoir 104. On the other hand, when the volume reservoir pressure drops to a selected value, due to its being connected with the atmospheric connection 146 past the open exhaust valve 134, the valve 106 operates to cut off communication between the conduits 148 and 150 and to connect the latter conduit to the atmosphere at the valve. Thus in the normal position of the parts illustrated, the control chamber 96 is vented to the atmosphere and the valve 84 will be in the open position to establish communication between the conduits 50 and 52 of the tractor service line 48.

In normal operation, application of the tractor brake valve 40 serves to charge the tractor brake chambers 22 and 24 and to cause fluid pressure to flow through the tractor service line 48 so as to charge the trailer brake chambers 62 and 64 from the trailer reservoir 68 through operation of the relay-emergency valve 70. During the initial charging of the tractor service line 48, the pressure differential acting across the diaphragm 111 of the fluid pressure actuator 110, created by the flow rate between the points of connection between the conduits 116 and 118 and the respective conduits 50 and 52 of the tractor service line 48, see A and B, will move the said diaphragm to the right in order to disconnect the volume reservoir 104 from the atmospheric connection 146 and establish a restricted communication between the reservoir and the conduit 50 of the tractor service line 48 by way of conduit 122, outlet chamber 126, inlet chamber 142, passage 140, timing choke 144 and conduit 116. However, due to the volume of the reservoir 104 and to the flow capacity of the choke 144, the pressure built up in the said reservoir will be insufficient to actuate the fluid pressure actuated valve 106 during normal service applications. Thus as the pressure is built up in the trailer service line and the brake valve 40 is finally moved to a lapped position, the fluid pressure differential acting across the diaphragm 111 will decrease to the point where the spring 120 moves the member 130 to the position shown. This action enables the spring 136 to close the inlet valve 138 of the timing valve 102 and the volume reservoir 104 is reconnected with the atmospheric port 146 by way of the conduits 122 and 124, the outlet chamber 126, bore 128 and the exhaust member 132. Thus during ordinary service brake applications, while the timing valve 102 operates to partially charge the volume reservoir, the cut-off valve will not function to interrupt the flow of fluid through the service lines of the vehicles. It will be understood, of course, that when the brake valve 40 is moved to exhaust position to release the vehicle brake chambers, the service lines 48 and 67 and the conduits 116 and 118 will be vented to the atmosphere through the brake valve.

Assuming however that the service lines 48 and 67 are uncoupled at the coupling 56 or that the service line connection between the valves 86 and 70 is ruptured or develops a severe leak, then upon operation of the brake valve 40 to apply the brakes in service, the fluid actuator 110 will operate in the same manner as aforesaid and the volume reservoir will again start to be charged with fluid under pressure. In this case, a substantially heavy flow of fluid for a much longer time will occur in the service line 48 and the timing valve 102 will be maintained in open position due to the continued application of the pressure differential across the diaphragm 111 and derived from the service line 48 at points A and B. Should such heavy flow continue for a sufficient length of time, the pressure built up in the volume reservoir 104 will finally be sufficient to operate the fluid pressure actuated valve 106 in order to interconnect the control chamber 96 of the cut-off valve 76 with the tractor service conduit 50 as well as with the volume reservoir 104. When this occurs, the valve 84 will be positively moved to its closed position in order to interrupt further flow of fluid pressure through the tractor service line 48 and thus conserve such pressure to be utilized for effective braking of the brakes on the tractor.

From the construction provided, it will be readily understood that as soon as the tractor brake valve 40 is moved to its exhaust position, the conduit 116 will be exhausted and the return of the timing valve 102 to the position illustrated will exhaust the volume reservoir 104 as well as the conduit 148. Movement of the valve 106 to its normal position will exhaust the control chamber 96 and allow the spring 98 to open the valve 84. As heretofore pointed out, the exhaust connection 146 may be restricted if desired, in order to retard the exhausting of the reservoir 104. This action would maintain the cut-off valve 76 closed during a substantial portion of the brake valve release operation.

It is contemplated that in addition to the foregoing, the automatic closing of the cut-off valve 76 will also occur during operaion of the brake valve 40 following a break-in-two of the vehicles. In such case, the loss of fluid pressure in the trailer emergency line 66 will cause an emergency application of the trailer brakes through operation of the relay-emergency valve 70 on the trailer. Although the tractor emergency line 42, will be vented to atmosphere under these conditions, the loss in pressure from the tractor reservoirs 14, 16 will not be sufficient to prevent a full application of the tractor brakes. Thus during operation of the tractor brake valve 40 following a parting of the vehicles, the parts including the timing valve 102, the volume reservoir 104, the pressure actuated valve 106 and the cut-off valve 76 will function in the manner previously described in order to cut off the flow of fluid pressure through the tractor service line 48. Hence even through pressure is being exhausted to atmosphere through the open tractor emergency line 42, still sufficient pressure will be available for effecting an emergency stop of the tractor.

From the foregoing, it will be readily appreciated that the invention provides a novel and efficient construction for conserving air on the tractor in the event of a broken service line or in the event that the vehicles are parted. The use of the cut-off valve 76 insures that the loss of all the available fluid pressure on the tractor through the tractor service line will be positively prevented under the conditions outlined. It will also be appreciated that the cooperation of the timing valve 102, the volume reservoir 104 and the pressure actuated valve 106 is such that the cut-off valve 76 is not operated during ordinary service brake applications. These parts only function to close the tractor service line when the flow rate therethrough, caused by a leak or rupture, is sufficiently high and takes place for a sufficient period of time as to allow the fluid pressure in the volume reservoir 104 to build up to the value sufficient to trip the valve 106. The flow rate through the tractor service line 48 is measured at the points A and B which may be respectively located adjacent the brake valve 40 and adjacent the coupling 56. The only limitation as to the location of these points is that they shall be spaced apart a sufficient distance as to cause the creation of a pressure differential which is high enough to move the diaphragm 111 against the tension of the spring 120.

While one embodiment of the invention has been disclosed and described herein with considerable particularity, it will be readily understood by those skilled in the art that various modifications may be resorted to without departing from the spirit of the invention. Reference will therefore be had to the appended claims for a definition of the limits of the invention.

What is claimed is:

1. In a fluid pressure operated vehicle braking system, a source of fluid pressure, a plurality of brake chambers, a brake valve connected with said source, a plurality of conduits connecting the brake valve and chambers, a normally open fluid pressure actuated valve in one of the conduits, and means to supply fluid pressure to the latter valve to close the same and interrupt the flow of fluid pressure from the source to at least one of the chambers, comprising a timing valve, and means for operating the timing valve in accordance with a predetermined pressure differential created between spaced-apart points in said one conduit due to the flow of fluid pressure therein.

2. In a fluid pressure operated vehicle braking system, a source of fluid pressure, a plurality of brake chambers, a brake valve connected with said source, a plurality of conduits connecting the brake valve and chamber, a normally open fluid pressure actuated valve in one of the conduits, and means to supply fluid pressure to the latter valve to close the same and interrupt the flow of fluid pressure from the source to at least one of the chambers, comprising a timing valve, means for operating the timing valve in accordance with a predetermined pressure differential created between spaced-apart points in said one conduit due to the flow of fluid pressure therein, a connection between the timing valve and the fluid pressure actuated valve, and a fluid pressure responsive valve for controlling said connection.

3. In a fluid pressure operated vehicle braking system, a source of fluid pressure, a plurality of brake chambers, a brake valve connected with said source, a plurality of conduits connecting the brake valve and chambers, a normally open fluid pressure actuated valve in one of the conduits, a timing valve, means for operating the timing valve in accordance with a predetermined pressure differential created between spaced-apart points in said one conduit due to the flow of fluid pressure therein, and means effective after operation of said timing valve to establish a restricted communication between the brake valve and said fluid pressure actuated valve.

4. In a fluid pressure operated vehicle braking system, a source of fluid pressure, a plurality of brake chambers, a brake valve connected with said source, a plurality of conduits connecting the brake valve and chamber, a normally open fluid pressure actuated valve in one of the conduits, a timing valve, means for operating the timing valve in accordance with a predetermined pressure differential created between spaced-apart points in said one conduit due to the flow of fluid pressure therein, and means effective after operation of said timing valve to establish a restricted communication between the brake valve and said fluid pressure actuated valve, said last named means including a fluid pressure responsive valve operable to establish said communication only after a predetermined rise in pressure therein.

5. In a fluid pressure operated vehicle braking system, a source of fluid pressure, a plurality of brake chambers, a brake valve connected with said source, a plurality of conduits connecting the brake valve and chamber, a normally open fluid pressure actuated valve in one of the conduits, and means to supply fluid pressure to the latter valve to close the same and interrupt the flow of fluid pressure from the source through said one conduit, comprising a connection between the brake valve and the fluid pressure actuated valve, a timing valve in said connection, means for operating the timing valve in accordance with a predetermined pressure differential created between spaced-apart points in said one conduit due to the flow of fluid pressure therein, a volume reservoir communicating with said connection, and means operable only after the pressure in said volume reservoir has reached a predetermined value for opening that portion of the connection between the timing valve and the fluid pressure actuated valve.

6. A braking system as set forth in claim 5 which comprises in addition, a restriction in that portion of the connection between the brake valve and the timing valve.

7. In a fluid pressure operated tractor-trailer braking system having interconnected tractor and trailer service and emergency lines, a source of fluid pressure on the tractor, a tractor brake valve for controlling the flow of fluid pressure from said source through the service lines, and means for interrupting said flow of fluid pressure through the tractor service line when the flow therethrough reaches a predetermined rate, comprising a normally open fluid pressure responsive valve in the tractor service line, a fluid pressure actuator movable in response to a predetermined pressure differential created between spaced-apart points in the tractor service line due to the fluid pressure flow therethrough at said predetermined flow rate, and means including a timing valve operable by movement of said actuator for supplying fluid pressure to the fluid pressure responsive valve to close the same and thereby interrupt flow through the tractor service line.

8. In a fluid pressure operated tractor-trailer braking system having interconnected tractor and trailer service and emergency lines, a source of fluid pressure on the tractor, a tractor brake valve for controlling the flow of fluid pressure from said source through the service lines, a normally open fluid pressure responsive valve in the tractor service line, and means for supplying fluid pressure to said valve to close the same and interrupt flow of fluid through the tractor service line when said flow reaches a predetermined rate, comprising a connection extending from a point in the tractor service brake line between the brake valve and the fluid pressure responsive valve, to said latter valve, a fluid pressure actuator movable in response to a predetermined pressure differential created between spaced-apart points in the tractor service line due to flow of fluid pressure therein, a timing valve normally closing said connection and movable to open position by movement of said actuator, and means including a fluid pressure actuated valve operable to establish communication through that portion of said connection between the timing valve and the fluid pressure responsive valve only after a predetermined rise in pressure in said portion.

9. In a fluid pressure operated tractor-trailer braking system having interconnected tractor and trailer service and emergency lines, a source of fluid pressure on the tractor, a tractor brake valve for controlling the flow of fluid pressure from said source through the service lines, a volume reservoir, a timing valve normally occupying a first position connecting the reservoir with the atmosphere and movable to a second position to interrupt the atmospheric connection and connect the reservoir with the tractor brake system, means including a diaphragm for moving the timing valve to said second position, said diaphragm being subjected on opposite sides thereof to the respective pressures developed at spaced-apart points in the tractor service line, a normally open fluid pressure responsive valve in the tractor service line, and means actuated when the pressure of the fluid in said reservoir reaches a predetermined value for connecting the reservoir with the fluid pressure responsive valve to close the latter.

10. In a fluid pressure operated tractor-trailer braking system having interconnected tractor and trailer service and emergency lines, a source of fluid pressure on the tractor, a tractor brake valve for controlling the flow of fluid pressure from said source through the service lines, a normally open fluid pressure responsive valve in the tractor service line, and means for supplying fluid pressure to said valve to close the same and interrupt flow of fluid through the tractor service line when said flow reaches a predetermined rate, comprising a connection extending from a point in the tractor service line between the brake valve and the fluid pressure responsive valve, to said latter valve, a fluid pressure actuator movable in response to a predetermined pressure differential created between spaced-apart points in the tractor service line due to flow of fluid pressure therein, a timing valve normally closing said connection and movable to open position by movement of said actuator, and means for controlling the flow of fluid pressure in that portion of said connection between the timing valve and the fluid pressure responsive valve, comprising a volume reservoir for storing fluid flowing to said portion past the open timing valve, and a fluid pressure actuated valve operable to open said portion of the connection when the pressure of the fluid in the volume reservoir reaches a predetermined value.

11. In a fluid pressure operated tractor-trailer braking system having interconnected tractor and trailer service and emergency lines, a source of fluid pressure on the tractor, a tractor brake valve for controlling the flow of fluid pressure from said source through the service lines, a normally open fluid pressure responsive valve in the tractor service line, a volume reservoir, means responsive to a predetermined pressure differential created between spaced-apart points in the tractor service line for establishing a restricted communication between the volume reservoir and the tractor service line, and means responsive to a predetermined pressure built up in the volume reservoir to connect the reservoir and the fluid pressure responsive valve to move the latter to closed position and thereby interrupt flow through the tractor service line.

12. In a fluid pressure operated tractor-trailer braking system having interconnected tractor and trailer service and emergency lines, a source of fluid pressure on the tractor, a tractor brake valve for controlling the flow of fluid pressure from said source through the service lines, a normally open fluid pressure responsive valve in the tractor service line, a volume reservoir, a timing valve normally occupying one position to connect the volume reservoir to atmosphere and movable to another position to connect said reservoir with the tractor service line, a fluid pressure actuator responsive to a predetermined pressure differential created between spaced-apart points in the tractor service line for moving said timing valve from said one position to said another position, and a fluid pressure operated valve movable to connect said reservoir and the fluid pressure responsive valve to close the latter when the pressure in said reservoir reaches a predetermined value.

13. In a fluid pressure operated tractor-trailer braking system having interconnected tractor and trailer service and emergency lines, a source of fluid pressure on the tractor, a tractor brake valve for controlling the flow of fluid pressure from said source through the service lines, a volume reservoir, means responsive to a predetermined pressure differential created between spaced-apart points in the tractor service line for establishing communication between the volume reservoir and the tractor service line, a normally open valve in the tractor service line and normally effective to allow fluid flow between said points, and means operable when a predetermined pressure has been built up in said reservoir to close said normally open valve.

14. In a fluid pressure operated vehicle braking system, a source of fluid pressure, a plurality of brake chambers, a brake valve connected with said source, a plurality of conduits connecting the brake valve and chambers, a normally open valve in one of said conduits, a fluid pressure actuator for said latter valve, and means to supply fluid pressure to said actuator to close the normally open valve and interrupt the flow of fluid pressure from the source through said one conduit, comprising a connection with said one conduit between the brake valve and the normally open valve and extending to said actuator, a normally closed timing valve in said connection, a fluid pressure responsive element movable to open said timing valve, means to subject one side of said element to the fluid pressure in said connection, and means to subject the other side of said element to the fluid pressure existing in said one conduit between the normally open valve and one of the chambers.

15. A system as set forth in claim 14 which comprises in addition, a fluid pressure responsive valve in said connection operable to establish fluid flow to said actuator only after a predetermined rise in fluid pressure in said connection.

ELLERY R. FITCH.

REFERENCES CITED

The following references are of record in the file of this patent:

UNITED STATES PATENTS

| Number | Name | Date |
| --- | --- | --- |
| 1,956,691 | McCune | May 1, 1934 |
| 1,969,812 | McCune | Aug. 14, 1934 |
| 2,084,707 | Robinson | June 22, 1937 |
| 2,248,437 | Robinson | July 8, 1941 |
| 2,451,139 | Williams et al. | Oct. 12, 1948 |